United States Patent [19]

Mercadal et al.

[11] Patent Number: 5,710,714
[45] Date of Patent: Jan. 20, 1998

[54] ELECTRONIC CONTROLLER FOR AN ADAPTIVELY TUNED VIBRATION ABSORBER

[75] Inventors: Mathieu Mercadal, Fontenay aux Roses, France; Kelvin B. Scribner; Andreas H. von Flotow, both of Hood River, Oreg.

[73] Assignee: Applied Power Inc., Butler, Wis.

[21] Appl. No.: 559,519

[22] Filed: Nov. 15, 1995

[51] Int. Cl.$^6$ ............................................. F16F 13/00
[52] U.S. Cl. ................................ 364/508; 324/76.77
[58] Field of Search .......................... 364/505, 508, 364/572; 73/657, 646; 267/218, 177, 140.11; 324/76.77, 76.53, 76.29; 333/175, 176

[56] References Cited

U.S. PATENT DOCUMENTS

| Re. 33,937 | 5/1992 | Schubert | 276/136 |
|---|---|---|---|
| 4,473,906 | 9/1984 | Warnaka et al. | 381/71 |
| 4,562,589 | 12/1985 | Warnaka et al. | 381/71 |
| 4,724,923 | 2/1988 | Waterman | 181/208 |
| 4,821,205 | 4/1989 | Schutten et al. | 364/508 |
| 4,878,188 | 10/1989 | Ziegler | 364/724.01 |
| 4,935,651 | 6/1990 | Hong et al. | 310/51 |
| 4,969,632 | 11/1990 | Hodgson et al. | 267/140 |
| 5,000,415 | 3/1991 | Sandercock | 248/550 |
| 5,174,552 | 12/1992 | Hodgson et al. | 267/140.11 |
| 5,182,887 | 2/1993 | Uno et al. | 52/167 R |
| 5,255,764 | 10/1993 | Kurabayashi et al. | 188/380 |
| 5,332,061 | 7/1994 | Majeed et al. | 180/312 |
| 5,564,537 | 10/1996 | Shoureshi | 188/380 |

FOREIGN PATENT DOCUMENTS

| 0 509 911 | 10/1992 | European Pat. Off. |
| 0 556 033 | 8/1993 | European Pat. Off. |
| 0 579 182 | 1/1994 | European Pat. Off. |
| 61-182112 | 1/1987 | Japan . |
| 61-286634 | 5/1987 | Japan . |
| 63-092851 | 9/1988 | Japan . |
| 2 222 657 | 3/1990 | United Kingdom . |
| 2 189 573 | 5/1990 | United Kingdom . |
| 2 277 360 | 10/1994 | United Kingdom . |
| WO 92/15088 | 9/1992 | WIPO . |

OTHER PUBLICATIONS

Blaszkkeiwicz et al., Tunable Transducers as Smart Materials, 1991 IEEE paper 91CH2817-5/91/0000-0899601.
Kienholz et al., Demonstration of Solar Array Vibration Suppression, North American Conference on Smart Structures and Materials Feb. 13-18 1994.
Hollkamp et al., A Self-Tuning Piezoelectric Vibration Absorber, 35th AIAA/ASME/AHS/ACS Structural Dynamic and Materials Conference Adaptive Structures Forum Apr. 18-22, 1994.
von Flotow et al., Adaptive Tuned Vibration Absorbers: Tuning Laws Tracking agility, Sizing, and Physical Implementations, Noise-Con 94, May 01-04, 1994.

Primary Examiner—Emanuel T. Voeltz
Assistant Examiner—Thomas Peeso
Attorney, Agent, or Firm—Quarles & Brady

[57] ABSTRACT

An apparatus for absorbing vibrations in a structural member has a mass suspended between two mounting plates by a separate springs. The mass has two sections and a mechanism for adjusting the spacing between the sections to alter the spring stiffness. Two sensors produce first and second signals representing the vibration of the structural member and the mass. The mechanism is operated by a controller that includes separate filters for the first and second signals in which each filter has a center frequency that is tuned by a clock signal. The phase comparator produces a phase output signal indicating a phase relationship between signals from the two filters and the control signal for the mechanism is produce in response to the phase output signal. A phase locked loop produces the clock signal for tuning the filters in response to a comparison between one of the first and second signals and a signal from one of the filters.

22 Claims, 4 Drawing Sheets

FIG. 5A

ELECTRONIC CONTROLLER FOR AN ADAPTIVELY TUNED VIBRATION ABSORBER

BACKGROUND OF THE INVENTION

The present invention relates to devices for countering vibration in structural members, such as those of an aircraft fuselage; and particularly to such devices which can be dynamically tuned to adapt performance to changes in vibration frequency.

Aircraft engines can induce significant vibration into the fuselage. In propeller powered aircraft, the propeller blades produce air pressure pulses which strike external surfaces of the airframe thereby causing a time periodic vibration of the airframe, at about 100 Hz for example. Jet engines also produce vibration in supporting members. If left unchecked, the induced vibrations create objectionable noise in the aircraft cabin, and may result in serious fatigue of the airframe.

As a consequence vibration absorbers are attached to structural members throughout the aircraft. For example, the Fokker 50 turbo prop airplane carries 150 frame-mounted absorbers. These devices typically are a simple mass-spring system in which a mass is attached to the airframe by a resilient member that acts as a spring. Elastomeric pads and metal cantilevers have been employed as the spring. The mass-spring system is fixedly tuned to resonate at the frequency of common vibrations in the structural member of the airframe to which the absorber is attached and thus optimally absorbs the vibration energy at that frequency. The absorber has a large mechanical impedance at resonance which is proportional to the quality factor Q. Absorption (mechanical impedance) at other frequencies diminishes as a function of the deviation from the absorber's resonant frequency.

A drawback of fixedly tuned absorbers is that the frequency of airframe vibrations varies with engine speed. Engine speed varies during operation, especially in the case with jet engines. Although the absorber may be tuned to the vibration frequency (e.g. 100 Hz) which occurs at the nominal cruising speed of the aircraft, less that optimal vibration absorption occurs at other engine speeds. In addition, the tuning of elastomeric type absorbers changes with the age of the elastomeric material, and both elastomeric and metal-type absorbers change their tuning with changes in temperature.

Therefore, it is desirable to provide an absorption system which is dynamically adaptive to variation of the vibration frequency. Such a dynamic system would require a controller that senses the vibration to be absorbed and produces a control signal to alter the tuning of a mechanical absorber.

SUMMARY OF THE INVENTION

An object of the present invention is to provide a system for absorbing time periodic vibrations in a body wherein the system is autonomously capable of adapting to variations in the vibration frequency.

Another object is to provide an electronic controller for such a vibration absorbing system in which the controller senses the vibration occurring in the body and tunes an absorber to the frequency of the vibration.

A further object of the present invention is to provide a controller which senses the vibration of a mass in the vibration absorber and tunes the absorber in response to a relationship between the vibration of the body and the mass.

These objects are fulfilled by a vibration absorber that has a mechanical resonator with a base for attachment to the body, a mass connected to the base by a spring and a mechanism which adjusts stiffness of the spring in response to a control signal. A first sensor produces a first signal indicating vibrational disturbance of the body, and a second sensor produces a second signal indicating movement of the mass.

A control circuit receives the signals from the two sensors and produces the control signal which operates the mechanism to tune the mass-spring assembly to resonate at the frequency of the vibrational disturbance. The control circuit comprises a filter circuit produces a first filtered signal from the first signal and another filter circuit produces a second filtered signal from the second signal. Both filter circuits preferably are band-pass types with a center frequency that is tuned by a clock signal.

A first phase comparator produces a phase output signal indicating a phase relationship between the first and second filtered signals which relationship is indicative of how accurately the mass-spring assembly is adaptively tuned to the frequency of the vibrational disturbance. Control logic produces the control signal for the mechanism in response to the phase output signal from the first phase comparator.

In the preferred embodiment, the phase output signal is integrated and the result is used as the control signal. This embodiment also applied the integrated signal to a window comparator the output from which inhibits operation of the mechanism that adjusts the mass-spring tuning when the integrated signal has a voltage within a predefined range. The window prevents a slight variation in signal voltage due to the signal noise from causing a tuning change.

The control circuit also provides a clock signal generator which utilizes one of the first and second signals and one of the first and second filtered signals to produce the clock signal. Preferably, the clock signal generator forms a phase locked loop with the filter circuit that produced the selected one of the first and second filtered signals. Specifically the phase locked loop has a second phase comparator that produces a comparison signal representing a phase relationship between the selected first or second signal and the selected filtered signal. An integrator generates an oscillator control signal by integrating the comparison signal and the oscillator control signal is used to set the frequency of the clock signal which is produced by a voltage controlled oscillator in the phase locked loop. Thus the clock signal frequency is varied in response to changes in the frequency of the vibrational disturbance in the body so that the filters are adjusted to the vibrational disturbance frequency.

In this manner, control circuit is tuned in response to changes in the disturbance frequency. Such tuning enables the control circuit to dynamically adjust the resonance of the vibration absorber 10 to track variations in vibration frequency.

DETAILED DESCRIPTION OF THE INVENTION

Figure 1:
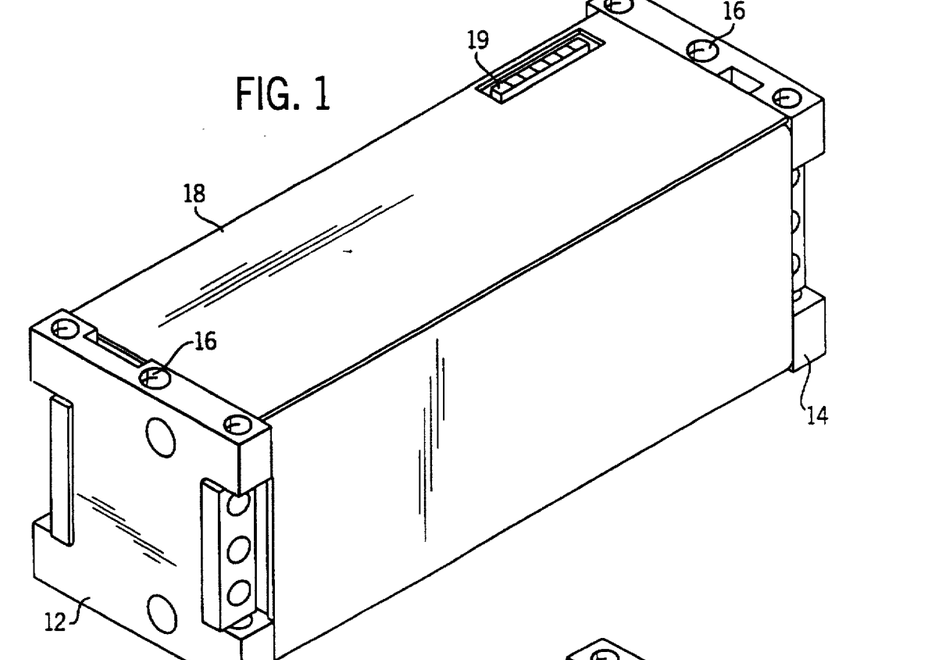
FIG. 1 is an isometric view of an enclosed vibration absorber according to the present invention.

With initial reference to FIG. 1, a vibration absorber 10 has a pair of spaced apart, I-shaped end plates 12 and 14. Each end plate has a central vertical aperture 16 extending there through for receiving a bolt to attach the vibration absorber 10 to a structural member, such as an aircraft fuselage, carrying the objectionable vibrations. The vibration absorber reduces the vibration in the attached structural member. Once fastened to the structural member the spacing between the end plates 12 and 14 is held constant. A four sided tubular cover 18 extends between the inner surfaces of the two end plates 12 and 14. The cover 18 forms an enclosure and holds the end plates apart so that tension can be applied to internal components, as will be described. An aperture through the cover 18 provides access to an electrical connector 19.

Figure 2:
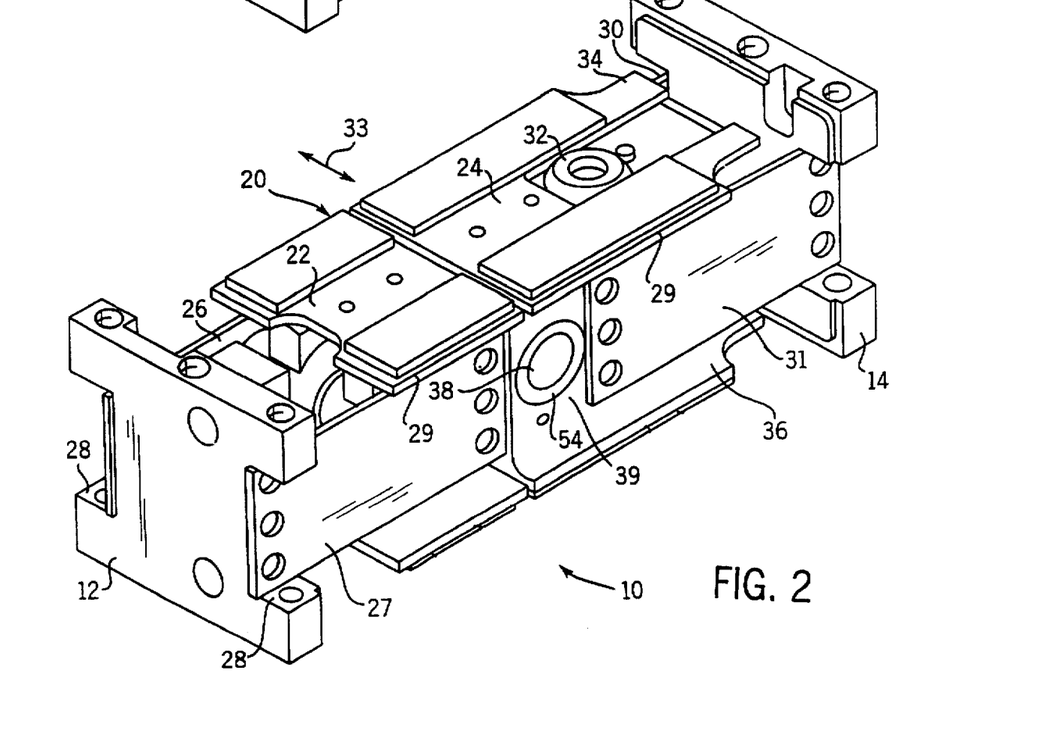
FIG. 2 is an isometric view of the vibration absorber with the cover removed.

With reference to FIG. 2 which shows the cover 18 removed, a proof-mass 20, comprising a slider block 22 and a driver block 24, is suspended between the two end plates 12 and 14. The slider block 22 is coupled to the first end plate 12 by a first pair of flexible metal straps 26 and 27 which are parallel to each other. Each metal strap 26 and 27 rests within separate side notches 28 in the I-shaped first end plate 12 and is bolted thereto. The opposite end of the two metal straps 26 and 27 are bolted to the slider block 22. Similarly, one end of each of a second pair of flexible metal straps 30 and 31 is bolted to the driver block 24, while opposite ends are bolted into side notches of the I-shaped second end plate 14 so that straps 30 and 31 are parallel to each other. The metal straps 26, 27, 30 and 31 act as springs, or flexures, which couple the components of the proof-mass 20 to the end plates 12 and 14 in a flexible manner. Because the straps lie in parallel planes the proof-mass can oscillate transversely between the end plates along axis 33. The spring and proof-mass assembly has a resonant frequency which is a function of the mass of the proof-mass 20 and stiffness of the springs formed by the straps 26, 27, 30 and 31. The vibration absorber is mounted to the airframe so that axis 33 coincides with the axis of vibration to be absorbed. When the resonant frequency matches the frequency of the vibration, the vibration energy is absorbed by the proof-mass oscillation. Three vibration absorbers can be mounted along orthogonal axes to provide three dimensional vibration absorption.

The driver block 24 supports a motor assembly 32 which is captivated between an upper plate 34 and a lower plate 36 of the driver block. The driver block has sidewalls 39 with aligned apertures extending therethrough within which is received the ends of a camshaft 38 that is operated by the motor assembly with reference to FIG. 3, the motor assembly 32 includes a stepper motor and a geared transmission and may be a FPS 3002 model manufactured by Futaba Corporation of America, Irvine, Calif. USA. The output of the transmission is coupled to a threaded lead screw 40. A transfer block 43 has a vertical threaded aperture through which the lead screw 40 extends and a pair of pins 44 projecting from opposite sides, with only one of the pins 44 being visible in the drawings. Each one of a pair of wrenches 46 on opposite sides of the motor assembly couple the transfer block 43 to camshaft 38.

Figure 3:
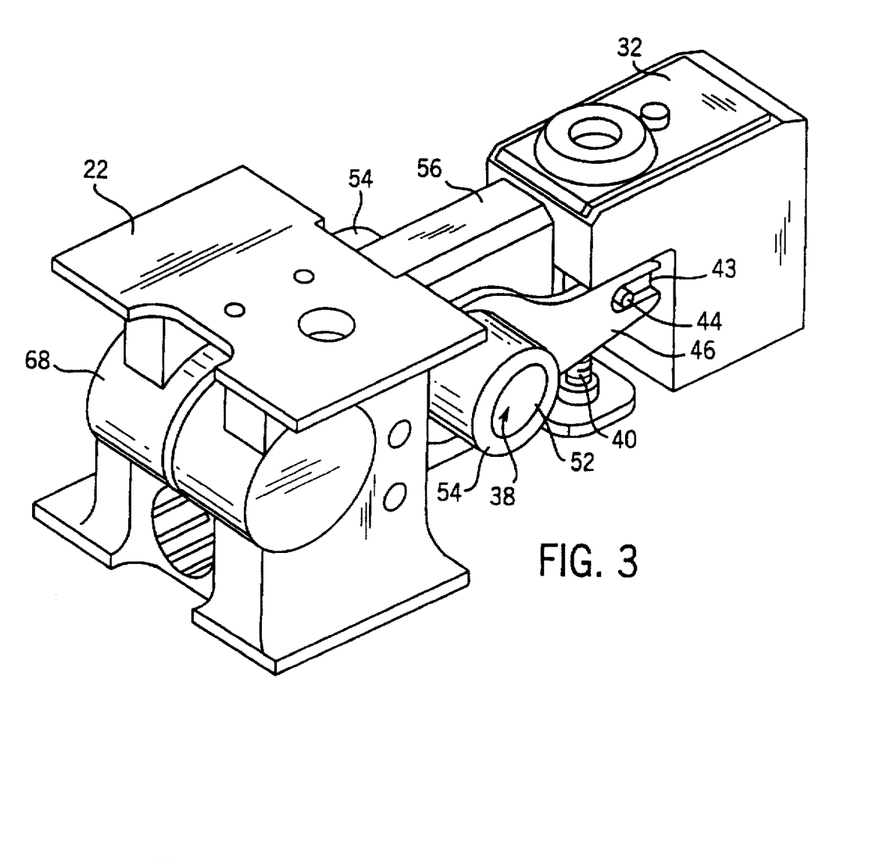
FIG. 3 is an isometric view of a subassembly of the vibration absorber shown in FIG. 1.

The camshaft 38 has a cylindrical center section which is within an aperture in arm 56 which projects from the main body of the slider block 22 toward the motor assembly 32. Smaller diameter sections 52 extend from opposite ends of the camshaft center section along a common axis which is off-center with respect to the axis of the cylindrical center section. In other words, the center section of camshaft 38 is not concentric with respect to the end sections 52. Each end section 52 is received in a separate bearing 54, which in turn fits within the apertures in the sidewalls 39 of the driver block 24 (see FIG. 2) thereby enabling the camshaft to freely rotate within those apertures.

The motor within assembly 32 is bi-directional with the direction of rotation determined by electrical signals applied to connector 19. Depending upon that direction of rotation, the lead screw 40 raises or lowers the transfer block 43 in the illustrated orientation of the vibration absorber 10. Since the wrenches 46 are coupled to the transfer block 43 by pins 44, the raising and lowering action produces rotation of the camshaft 38 within the apertures of the slider and driver blocks 22 and 24. Due to the eccentricity of the central camshaft section 48 with respect to the end sections 52, rotation of the camshaft 38 causes the slider block 22 to move toward or away from the driver block 24. However, because the four flexible metal straps 26, 27, 30, and 31 connect the slider block 22 and the driver block 24 to opposite end plates 12 and 14 which are rigidly secured to the aircraft, rotation of the camshaft 38 alters the tension on those metal straps. Thus, the tension on the metal straps 26, 27, 30, and 31 can be increased or decreased by operating motor assembly 32. The cover 18, holding the end plates apart (FIG. 1), maintains a preload tension on the metal straps. Alteration of the strap tension changes stiffness of the spring in the mass-spring structure and thus tunes the resonant frequency of the vibration absorber 10. This enables the absorber 10 to be tuned dynamically to different vibration frequencies within the aircraft structure.

Figure 4:
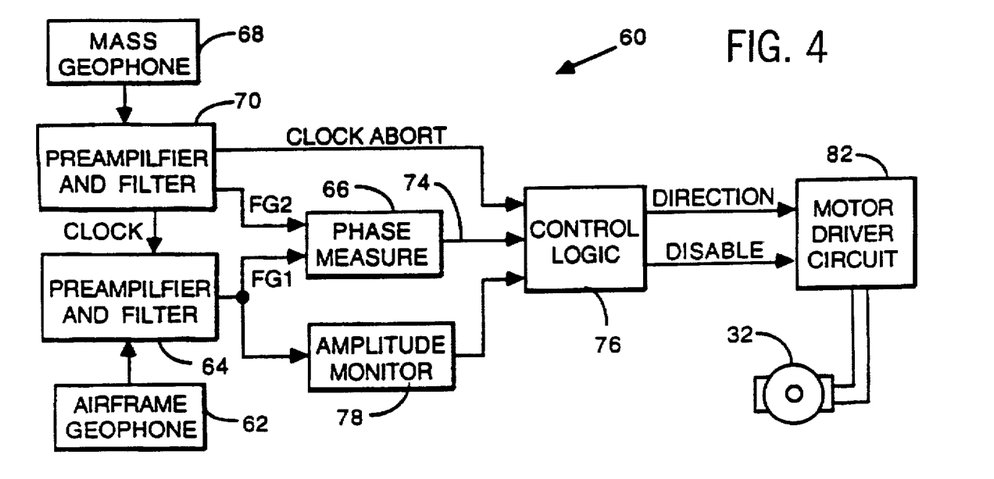
FIG. 4 is a block schematic circuit diagram of a controller for sensing airframe vibrations and adjusting the resonant frequency of the vibration absorber.

Referring to FIG. 4, the spring stiffness for the vibration absorber 10 is varied by a controller 60 in response to the sensed vibration disturbance in the airframe. An airframe geophone 62 is attached to the first end plate 12 to sense vibration occurring along axis 33 (FIG. 2) in the airframe structural member to which that end plate is attached. As an alternative, the airframe geophone 62 could be attached directly to the structural member. The geophone has a resonance close to 28 Hz and acts as a velocity sensor above the resonant frequency. The output signal from airframe geophone 62, representing the airframe structural vibrations, is applied to an input of a first signal conditioner and filter circuit 64.

A proof-mass geophone 68 is attached to the slider block 22 of the vibration absorber, as shown in FIG. 3, to sense the vibration of the absorber proof-mass 20 along axis 33. The output signal from the mass geophone is fed to a second signal conditioner and filter circuit 70. Both the airframe and proof-mass geophones 62 and 68 may be GS14-L9 models manufactured by Geospace Corporation of Houston, Tex., USA. Alternatively, accelerometers can be used in place of the two geophones.

Figure 5A:
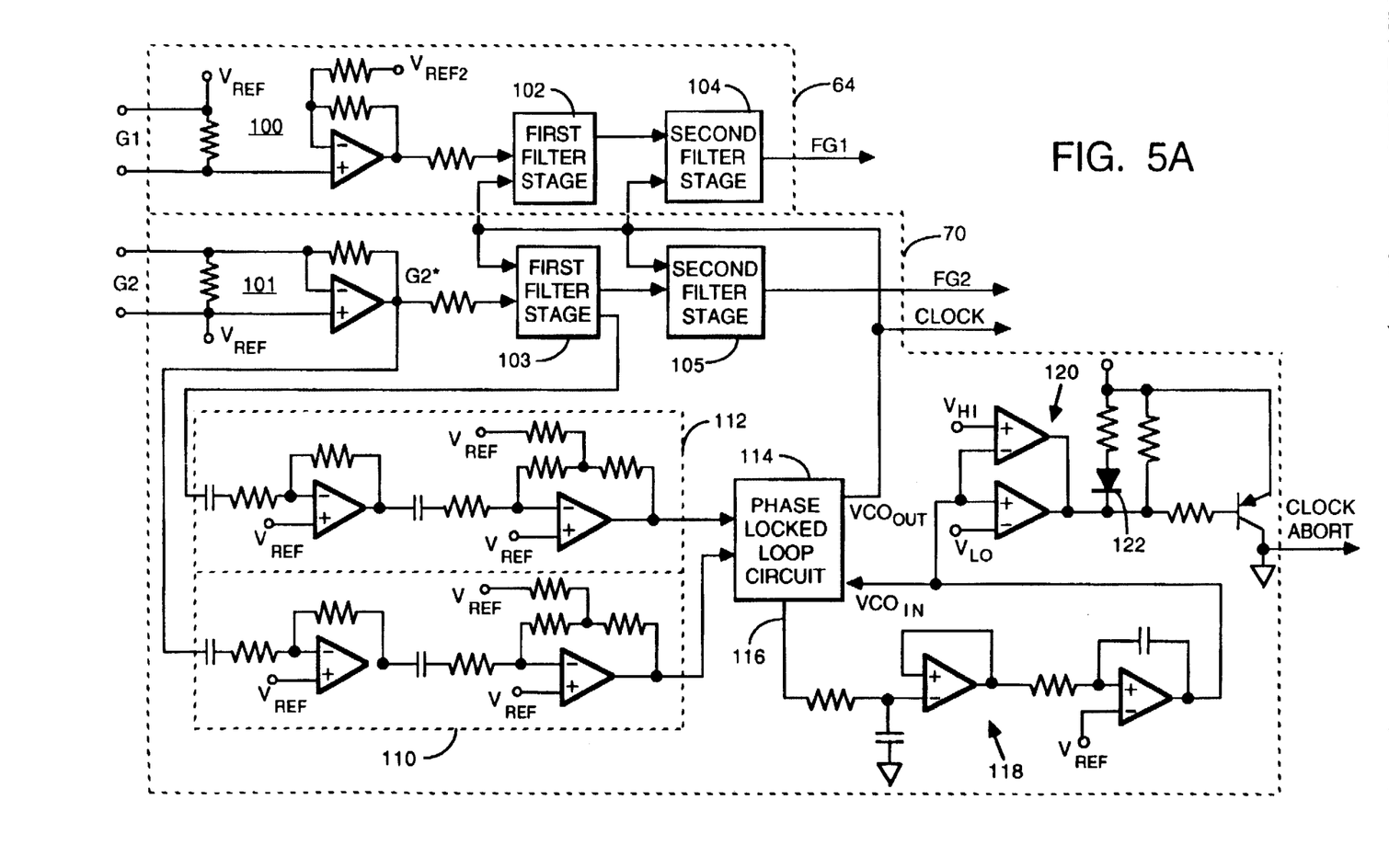
FIGS. 5A and 5B are more detailed schematic diagrams of the controller circuitry.
Figure 5B:
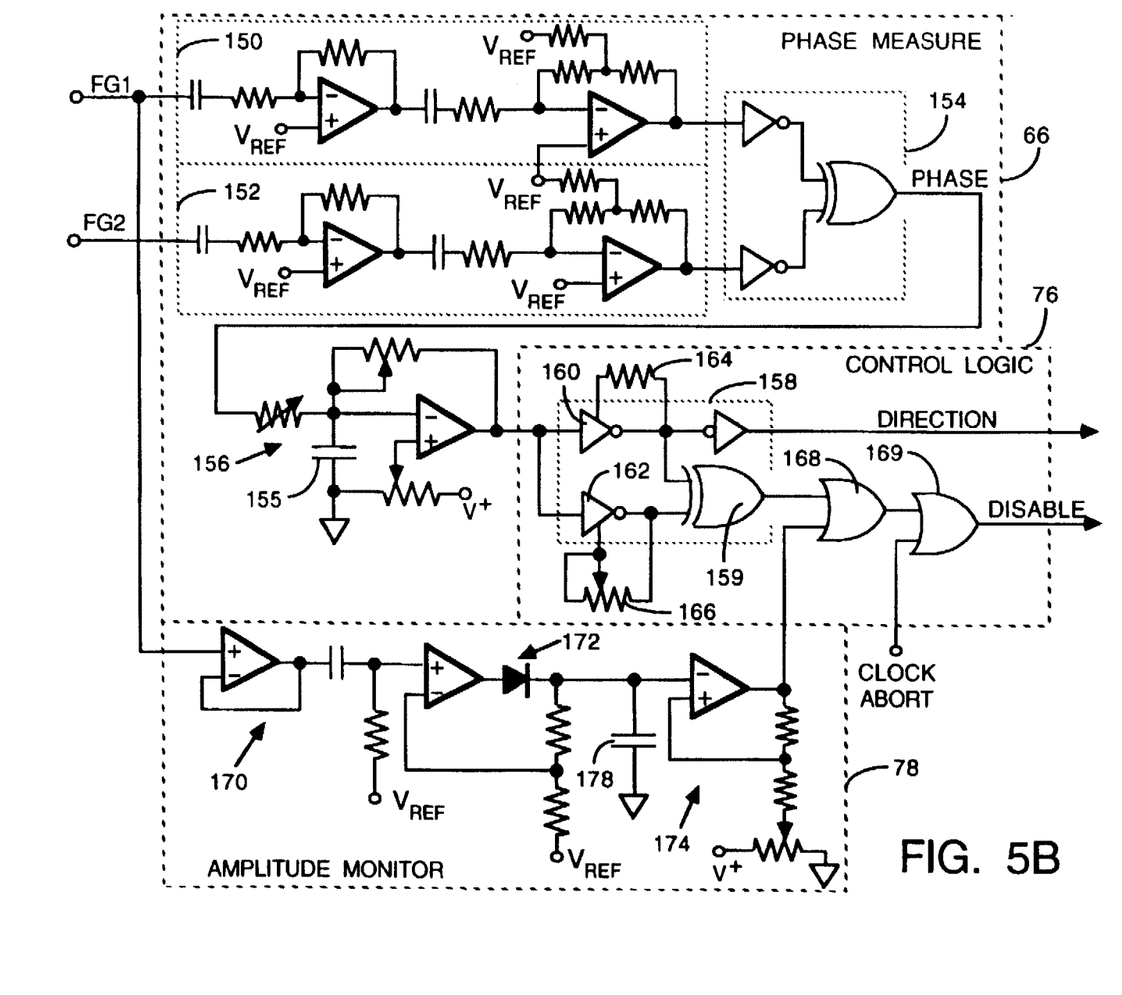

FIGS. 5A and 5B show details of the circuitry for controller 60. The preamplifier and filter circuits 64 and 70 depicted in FIG. 5A process both geophone signals G1 and G2 in the same manner. However, the circuit for the airframe geophone signal also contains a clock signal generator. The two geophone signals G1 and G2 are applied to separate preamplifier stages 100 and 101 with the resultant signals being fed to a different first filter stage 102 and 103 respectively. The outputs of the first filter stage 102 and 103 of each geophone signal channel is applied to the input of a second filter stage 104 and 105, respectively, to produce filtered geophone signals FG1 and FG2.

The four filters stages 102-105 are bandpass types with a center frequency tuned to frequency of the vibration to be absorbed. For example, when the absorber is to be used in a propeller driven aircraft in which the blades produce airframe vibration at 100 Hz, the center frequency of these filters is tuned dynamically to that vibration frequency. The width of the pass band is relatively narrow to filter out disturbance from other sources. The four filters stages 102-105 preferably are implemented using a switched capacitor filter network, such as a LTC1060 integrated circuit manufactured by Linear Technology Corporation, in which the center bandpass frequency is set by the frequency of a clock signal, designated CLOCK. For the LTC1060 integrated circuit, the CLOCK signal is a hundred times the desired center frequency.

The first and second cascaded filter stages, which are tuned the same, aggressively filter each geophone signal to eliminate all other frequency components. One drawback of such aggressive filtering is that tuning errors can result in the desired vibration signal frequency being filtered down. To overcome this potential problem, filter stages 104-107 are electrically tuned by the CLOCK signal that is uniquely derived from a phase locked loop.

Referring still to FIG. 5A, the CLOCK signal is produced by applying the output signal G2* from mass geophone preamplifier 101 to a first precision comparator stage 110. That stage 110 compares the sinusoidal G2* signal to a reference voltage Vref to convert that signal into a square wave. The LTC 1060 integrated circuit used as the first filter stage 103 for the mass geophone signal also has a low-pass filter with a cutoff frequency tuned to the vibration frequency (e.g. 100 Hz). Alternatively, a separate filter stage which is tunable by the CLOCK signal could be employed to produce the low-pass filtered signal or the bandpass output of the first filter stage could be used in place of the low-pass filtered signal. The output of this low-pass filter is applied to a second precision comparator stage 112 to convert the filter output into a square wave signal. Both of the precision comparator stages 110 and 112 comprise a pair of comparators connected in series to ensure true square wave conversion without clipped sinusoidal components in the resultant signal.

The two square wave signals from the pair of precision comparator stages 110 and 112 are coupled to the comparator and signal inputs of a phase locked loop circuit 114, such as a model CD4046 integrated circuit. The phase difference between the two square wave input signals will be ninety degrees when the circuitry is properly tuned to the vibration frequency, i.e. the CLOCK signal frequency is correct. If filter stages 102-105 are tuned low, the phase difference will be greater than ninety degrees and less than ninety degrees when the filter stages are tuned too high. The phase locked loop circuit 114, contains a signal phase comparator and a voltage controlled oscillator (VCO). The phase comparator output 116 of the phase locked loop circuit 114 is connected to an integrator stage 118 which also compares the integrated phase comparison signal to a reference voltage Vref to produce a control voltage for the voltage controlled oscillator in the phase locked loop circuit 114. The voltage controlled oscillator produces the CLOCK signal which tunes the four switched capacitor filter stages 102-105.

Thus the first filter stage 103 in the mass geophone signal channel is part of the phase locked loop and the accuracy of that filter stage's tuning determines the CLOCK signal frequency which in turn sets the center frequency of all the filter stages. As a result, the tuning of the filter stages 102-105 tracks changes in the vibration frequency. As a result, the tuning of the filter stages 102-105, and thus the performance of the control circuit as a whole, tracks changes in the vibration frequency. By adaptively tuning the pure filter stages in this manner, the controller 60 creates sinusoids from the geophone signals G1 and G2 and while accurately maintaining phase match between these two signal paths.

The control voltage for the voltage controlled oscillator within the phase locked loop circuit 114 also is checked to determine if that voltage has drifted too close to either ground or the positive supply voltage V$^+$. A window comparator 120 indicates whether the VCO control voltage is within an acceptable range bounded by voltage levels Vhi and Vlo. When the VCO control voltage is outside this range a light emitting diode 122 illuminates and a high CLOCK ABORT signal is produced by the preamplifier and filter circuit 70. The use of the CLOCK ABORT signal will be described subsequently.

The filtered geophone signals FG1 and FG2 from preamplifier and filter circuits 64 and 70 are applied to the phase measure circuit 66 shown in FIG. 5B. Each signal passes through a separate precision comparator stage 150 and 152, each comprising a pair of comparators connected in series to ensure that the filter output is converted into a square wave signal which does not have clipped sinusoidal components. The resultant square wave signals are applied inputs of an exclusive OR (XOR) gate 154 with Schmitt triggers at the inputs, such as a model 4583 integrated circuit. XOR gate 154 provides a pulsed signal, designated PHASE, having a variable duty cycle which is a function of the phase difference between the two processed geophone signals. At a ninety degree phase difference the duty cycle is fifty percent. The frequency of the PHASE signal at the output of XOR gate 154 is twice the vibration frequency. The PHASE signal is amplified by a non-inverting amplifier stage 156 with adjustable gain. The capacitor 155 within amplifier stage 156 integrates the pulsed PHASE signal into a signal whose mean voltage level corresponds to the duty cycle of the pulses. That signal oscillates between its mean level. The size of the ripples depend on the RC time constant of the capacitor network. Thus the voltage level at the output of amplifier stage 156 may vary slightly even when the vibration absorber 10 is properly tuned.

When the resonant frequency of the vibration absorber 10 matches the frequency of vibration in the airframe, the two filtered geophone signals FG1 and FG2 will be in quadrature, i.e. ninety degrees out of phase. At that time, phase measure circuit 66 produces an output voltage level designated $V_{90}$ indicative of the quadrature relationship; for example, the nominal level of $V_{90}$ can be one-half the supply voltage to the phase measure circuit. As noted above, the actual voltage fluctuates because its corresponds to the integral of a pulse train signal.

Phase deviation of the two filtered geophone signals FG1 and FG2 from quadrature alters the output voltage from the phase measure circuit 66 whereby the magnitude of the difference between the output voltage and the quadrature voltage level $V_{90}$ indicates the magnitude of the phase difference from quadrature, and the direction of voltage difference denotes the direction of the phase shift between the geophone signals.

The output of the phase measure circuit 66 is applied to the input of the control logic 76. That input is connected to circuit section 158, such as a model 4583 integrated circuit, which has an exclusive OR (XOR) gate 159 with Schmitt triggers 160 and 162 at the inputs. The phase measure circuit output signal is applied to both of Schmitt triggers 160 and 162, the combined operation of which define a voltage range centered about the quadrature voltage level $V_{90}$. For example, one Schmitt trigger 160 may provide a positive hysteresis set at one volt above the quadrature voltage level $V_{90}$, while the other Schmitt trigger 162 is set at a negative hysteresis at one volt below the quadrature voltage $V_{90}$. Resistors 164 and 166 define the voltage range.

The output signals from the two Schmitt triggers 160 and 162 are applied to inputs of XOR gate 159. When the phase measure circuit's output voltage is outside the two-volt range centered at the quadrature voltage level $V_{90}$, the XOR gate 159 causes the output gates 168 and 169 of the control logic 76 to produce a low DISABLE signal, otherwise a high DISABLE signal is produced. As will be described, a high DISABLE signal inhibits operation of the motor assembly 32 and thus alteration of the spring stiffness for the vibration absorber. Therefore if a significant phase difference between the signals from geophones 62 and 68 occurs, the phase measure output signal will be outside the deadband range of the XOR gate 159 resulting in activation of the motor assembly 32. Circuit section 158 prevents the normal ripple in the phase measure output signal about the quadrature voltage level $V_{90}$ from altering the tuning of the vibration absorber 10.

The output from one of the Schmitt triggers 160 in circuit section 158 is used as a DIRECTION signal which indicates the direction that the motor assembly 32 should move to adjust the vibration absorber tuning.

The control logic 76 also produces a high DISABLE signal in response to a signal from an amplitude monitor 78 which receives signal FG2 produced by the airframe geophone preamplifier and filter circuit 64. The FG2 signal passes through a buffer stage 170 and an amplifier stage 172 which applies a positive gain to positive signal levels and zero gain to negative signal levels. Capacitor 173 integrates the resultant signal at the output of the amplifier stage 172. The integrated signal is fed to a comparator stage 174 that produces an AMPLITUDE ABORT signal which is applied to a first OR gate 168 in order to produce the DISABLE signal at the output of a second OR gate 169.

Therefore, if the amplitude of the airframe geophone signal G1 becomes too small to provide reliable tuning of the vibration absorber 10, the AMPLITUDE ABORT signal from amplitude monitor 78 causes drive logic 76 to produce a high DISABLE signal. That action inhibits alteration of the vibration isolator tuning under such conditions. The CLOCK ABORT signal from the preamplifier and filter circuit 70 is applied to an input of OR gate 169 to produce a high DISABLE signal when the CLOCK signal frequency drifts too far.

Referring again to FIG. 4, the DISABLE and DIRECTION signals are coupled to a conventional stepper motor driver 82. The motor driver 82 responds to these signals by producing power signals for operating the stepper motor in assembly 32 to tune the resonant frequency of the vibration absorber 10.

When the vibration absorber 10 is properly tuned to the frequency of airframe vibration, the signals from the geophones 62 and 68 are in quadrature. This signal state causes the controller 60 to produce a high DISABLE signal which inhibits the motor driver 82 from operating the motor assembly 32. When the vibration absorber 10 is not properly tuned, the signals from the airframe and proof-mass geophones 62 and 68 will be out of quadrature. This condition results in the phase measure circuit output signal being outside the deadband range set by the Schmitt triggers 160 and 162 in the control logic 76. As a consequence, the control logic 76 produces a low DISABLE signal which enables the motor driver 84 to produce a drive signal for the stepper motor within the motor assembly 32. That drive signal causes the stepper motor to move in the direction specified by the DIRECTION signal from the drive logic 76.

The motor assembly 32 turns the lead screw 40 which moves wrenches 46 and 47 and camshaft 38 to alter the spacing between the slider block 22 and the driver block 24. This movement of the two blocks 22 and 24 changes the tension on the flexible metal straps 26, 27, 30 and 31, thereby changing the stiffness of the spring in the vibration absorber 10. This change in the spring stiffness alters the resonant frequency of the vibration absorber until it matches the frequency of vibration of the airframe structural member. When that match occurs, the signals from the two geophones 62 and 68 once again will be in quadrature causing the controller 60 to produce a high DISABLE signal thereby terminating operation of the motor assembly 32.

In this manner, the controller 60 operates motor assembly 32 to dynamically adjust the resonant frequency of the vibration absorber 10 to track variations in vibration frequency resulting from changes in aircraft engine speed. In addition the system compensates for variation in resonant frequency which result from changes in temperature or material aging. By means of this adaptive tuning, the mass-spring system of vibration absorber 10 provides high quality factor resonance at the precise disturbance frequency.

The foregoing description is directed to the preferred embodiment of the present invention. Although some attention was given to various alternatives within the scope of the invention, it is anticipated that skilled artisans will likely realize additional alternatives that are now apparent from the disclosure of those embodiments. For example, even though the vibration absorber is being described in the context of use in an aircraft, the invention has application in other types of structures that are subjected to vibration. Accordingly, the scope of the invention should be determined from the following claims and not limited by the above disclosure.

We claim:

1. A vibration absorber comprising:

a mechanical resonator having a member for attachment to a body in which a vibrational disturbance occurs, a mass, and a spring connected between the member and the mass, said resonator further having a mechanism which adjusts stiffness of said spring in response to a control signal;

a first sensor which produces a first signal indicating the vibrational disturbance;

a second sensor which produces a second signal indicating movement of the mass; and a control circuit comprising:
 (a) a first filter circuit which receives the first signal and produces a first filtered signal, said first filter circuit has a filter frequency that is tuned by a clock signal;
 (b) a second filter circuit which receives the second signal and produces a second filtered signal, said second filter circuit has a filter frequency that is tuned by the clock signal;
 (c) a first phase comparator which produces a phase output signal indicating a phase comparison of the first and second filtered signals;

(d) a mechanism control circuit which produces the control signal for the mechanism in response to the phase output signal from said first phase comparator; and (e) a clock signal generator which responds to one of the first and second signals and one of the first and second filtered signals by producing the clock signal.

2. The vibration absorber as recited in claim 1 wherein each of said first and second filter circuits comprises a band-pass filter with a center frequency which is adaptively tuned by the clock signal to track changes in a frequency of the vibrational disturbance.

3. The vibration absorber as recited in claim 1 wherein each of said first and second filter circuits comprises a pair of band-pass filters connected in series.

4. The vibration absorber as recited in claim 1 wherein each of said first and second filter circuits comprises a switched capacitor filter.

5. The vibration absorber as recited in claim 1 wherein said clock signal generator forms a phase locked loop with one of said first and second filter circuits.

6. The vibration absorber as recited in claim 5 wherein the clock signal generator comprises:

a second phase comparator which produces a comparison signal representing a phase comparison of the second signal and the second filtered signal;

an integrator connected to said second phase comparator and which produces an oscillator control signal by integrating the comparison signal;

a voltage controlled oscillator which produces the clock signal which has a frequency which is determined in response to the oscillator control signal received from the integrator.

7. The vibration absorber as recited in claim 6 wherein said clock signal generator further comprises a first converter that converts the second signal into a square wave that is applied to the second phase comparator; and a second converter that converts the second filtered signal into a square wave that is applied to the second phase comparator.

8. The vibration absorber as recited in claim 6 further comprising a window comparator connected to the integrator and which produces an clock abort signal when the oscillator control signal has a voltage that is outside a predefined range; and wherein operation of the mechanism is inhibited in response to the clock abort signal.

9. The vibration absorber as recited in claim 1 wherein said first phase comparator comprises a first signal converter which converts the first filtered signal into a first square wave signal; and a second signal converter which converts the second filtered signal into a second square wave signal.

10. The vibration absorber as recited in claim 9 wherein said first phase comparator further comprises an exclusive OR gate having a first input to which the first square wave signal is applied and a second input to which the second square wave signal is applied.

11. The vibration absorber as recited in claim 10 wherein said first phase comparator further comprises an integrator which integrates and output signal form the exclusive OR gate to produce the phase output signal.

12. The vibration absorber as recited in claim 11 wherein said mechanism control circuit comprises a signal converter that responds to the phase output signal by producing the control signal which commands a tuning direction in which to operate the mechanism.

13. The vibration absorber as recited in claim 12 wherein said signal converter utilizes asymmetric hysteresis that results in the mechanism being enabled only when the phase output signal exceeds a predefined signal range, and being disabled when the phase output signal subsequently returns within the predefined signal range and then traverses a predefined threshold which is encompassed by the predefined signal range.

14. The vibration absorber as recited in claim 10 wherein said control circuit further comprises an amplitude monitor which produces an amplitude abort signal when one of the first and second signals has an amplitude below a predetermined level, and wherein operation of the mechanism is inhibited in response to the amplitude abort signal.

15. A vibration absorber comprising:

mass-spring assembly having first and second members for attachment to a body in which a vibrational disturbance occurs, a mass formed by first and second blocks, a first spring connected between the first member and the first block, a second spring connected between the second member and the second block, said spring-mass assembly further having a mechanism which responds to a control signal by varying a distance between the first and second blocks to thereby alter stiffness of the first and second springs;

a first sensor which produces a first signal indicating the vibrational disturbance;

a second sensor which produces a second signal indicating movement of the mass; and a control circuit comprising:

(a) a first filter circuit which receives the first signal and produces a first filtered signal, said first filter circuit has a center frequency that is tuned by a clock signal;

(b) a second filter circuit which receives the second signal and produces a second filtered signal, said second filter circuit has a center frequency that is tuned by the clock signal;

(c) a first phase comparator which produces a phase output signal indicating a phase comparison of the first and second filtered signals;

(d) a mechanism control circuit which produces the control signal for the mechanism in response to the phase output signal from said first phase comparator; and (e) a clock signal generator which responds to one of the first and second signals and one of the first and second filtered signals by producing the clock signal.

16. The vibration absorber as recited in claim 15 wherein said clock signal generator forms a phase locked loop with the second filter circuit; said phase locked loop including a second phase comparator which produces a comparison signal representing a phase relationship between the second signal and an output signal from the second filter; an integrator connected to said second phase comparator and producing an oscillator control signal by integrating the comparison signal; a voltage controlled oscillator which produces the clock signal wherein a frequency of the voltage controlled oscillator is determined in response to the oscillator control signal.

17. The vibration absorber as recited in claim 16 wherein said clock signal generator further comprises a first converter which converts the second signal into a square wave that is applied to the second phase comparator; and a second converter which converts the output signal from the second filter into another square wave that is applied to the second phase comparator.

18. The vibration absorber as recited in claim 16 further comprising a window comparator connected to the integrator and which produces a clock abort signal when the oscillator control signal has a voltage that is outside a predefined range; and wherein operation of the mechanism is inhibited in response to the clock abort signal.

19. The vibration absorber as recited in claim 15 wherein said first phase comparator comprises a first signal converter which converts the second signal into a first square wave signal; and a second signal converter which converts the second filtered signal into a second square wave signal.

20. The vibration absorber as recited in claim 19 wherein said first phase comparator further comprises an exclusive OR gate having a first input to which the first square wave signal is applied and a second input to which the second square wave signal is applied.

21. The vibration absorber as recited in claim 20 wherein said first phase comparator further comprises an integrator which integrates and output signal form the exclusive OR gate to produce the phase output signal.

22. The vibration absorber as recited in claim 20 wherein said control circuit further comprises an amplitude monitor which produces an amplitude abort signal when one of the first and second signals has an amplitude below a predetermined level, and wherein operation of the mechanism is inhibited in response to the amplitude abort signal.

* * * * *